United States Patent
Holz (10) Patent No.: US 10,222,871 B2
(45) Date of Patent: *Mar. 5, 2019

(54) RESOURCE-RESPONSIVE MOTION CAPTURE

(71) Applicant: Leap Motion, Inc., San Francisco, CA (US)

(72) Inventor: David Holz, San Francisco, CA (US)

(73) Assignee: Leap Motion, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/641,128

(22) Filed: Jul. 3, 2017

(65) Prior Publication Data

US 2017/0300125 A1 Oct. 19, 2017

Related U.S. Application Data

(63) Continuation of application No. 14/214,569, filed on Mar. 14, 2014, now Pat. No. 9,733,715.

(60) Provisional application No. 61/792,354, filed on Mar. 15, 2013.

(51) Int. Cl.
  *G06F 3/00* (2006.01)
  *G06F 3/01* (2006.01)

(52) U.S. Cl.
  CPC .............. *G06F 3/017* (2013.01); *G06F 3/005* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 6,757,730 | B1* | 6/2004 | Lee | G06F 9/465 709/201 |
| 7,451,457 | B2 | 11/2008 | Estrop | |
| 8,788,944 | B1 | 7/2014 | Gill et al. | |
| 9,733,715 | B2* | 8/2017 | Holz | G06F 3/005 |
| 9,986,153 | B2* | 5/2018 | Holz | G06K 9/00355 |
| 2003/0217297 | A1 | 11/2003 | Gschwind et al. | |
| 2006/0078264 | A1 | 4/2006 | Lauzier et al. | |
| 2007/0050548 | A1 | 3/2007 | Bali et al. | |
| 2009/0138318 | A1 | 5/2009 | Hawkins et al. | |

(Continued)

OTHER PUBLICATIONS

Ehliar, A., et al, "Benchmarking Network Processors," Department of Electrical Engineering, Linkoping University, Sweden, Copyright 2004, 4 pages.
U.S. Appl. No. 14/214,569—Office Action dated Dec. 11, 2015, 11 pages.
U.S. Appl. No. 14/214,569—Office Action dated Jun. 22, 2016, 15 pages.
U.S. Appl. No. 14/214,569—Reponse to Jun. 22 Office Action filed Sep. 22, 2016, 13 pages.

(Continued)

*Primary Examiner* — Tsung Yin Tsai
(74) *Attorney, Agent, or Firm* — Haynes Beffel & Wolfeld LLP; Ernest J. Beffel, Jr.

(57) ABSTRACT

The technology disclosed relates to operating a motion-capture system responsive to available computational resources. In particular, it relates to assessing a level of image acquisition and image-analysis resources available using benchmarking of system components. In response, one or more image acquisition parameters and/or image-analysis parameters are adjusted. Acquisition and/or analysis of image data are then made compliant with the adjusted image acquisition parameters and/or image-analysis parameters. In some implementations, image acquisition parameters include frame resolution and frame capture rate and image- (Continued)

analysis parameters include analysis algorithm and analysis density.

20 Claims, 9 Drawing Sheets

(56) References Cited

U.S. PATENT DOCUMENTS

| | | |
|---|---|---|
| 2010/0027845 A1 | 2/2010 | Kim et al. |
| 2010/0129001 A1 | 5/2010 | Tsukada |
| 2010/0214410 A1 | 8/2010 | McClure et al. |
| 2011/0279475 A1* | 11/2011 | Ikenoue ............... G06K 9/6204 345/619 |
| 2012/0084091 A1* | 4/2012 | Hanina ............... G06F 19/3456 705/2 |
| 2013/0060837 A1 | 3/2013 | Chakraborty et al. |
| 2013/0251340 A1 | 9/2013 | Jiang et al. |
| 2013/0315479 A1 | 11/2013 | Paris et al. |
| 2014/0285428 A1* | 9/2014 | Holz ....................... G06F 3/005 345/156 |
| 2014/0376773 A1* | 12/2014 | Holz ..................... G06F 1/1686 382/103 |
| 2015/0067019 A1 | 3/2015 | Balko |

OTHER PUBLICATIONS

U.S. Appl. No. 14/214,569—Response to Dec. 11 Office Action filed Mar. 9, 2016, 9 pages.
U.S. Appl. No. 14/214,569—Office Action dated Mar. 21, 2016, 13 pages.
U.S. Appl. No. 14/214,569—Response to Mar. 21 Office Action filed May 23, 2016, 10 pages.
U.S. Appl. No. 14/214,569—Office Action dated Oct. 5, 2016, 16 pages.
U.S. Appl. No. 14/214,569—Notice of Allowance dated May 1, 2017, 9 pages.

* cited by examiner

RESOURCE-RESPONSIVE MOTION CAPTURE

RELATED APPLICATION

This application is a continuation of U.S. application Ser. No. 14/214,569, entitled "RESOURCE-RESPONSIVE MOTION CAPTURE", filed 14 Mar. 2014, which claims the benefit of U.S. provisional Patent Application No. 61/792,354, entitled, "RESOURCE-RESPONSIVE MOTION CAPTURE," filed 15 Mar. 2013. These applications are hereby incorporated by reference for all purposes.

FIELD OF THE TECHNOLOGY DISCLOSED

The technology disclosed relates generally to systems and methods for capturing motions of objects in three-dimensional space, and more specifically to resource usage in motion-capture systems.

BACKGROUND

A motion-capture system captures movement of a user, a portion of the user's body (often one or more of the user's hands) and/or object in three-dimensional ("3D") space using a computing device connected to one or more cameras. Once movement is captured, the computing device can interpret the movement as a user-input command and update a computer display accordingly. For example, the computer display can illustrate a virtual representation of the user's hands and update that representation as the user moves his hands. In another example, the computer display can illustrate a virtual object that is manipulated (e.g., rotated or resized) as the user's hands move.

Processing a sequence of captured images quickly enough to detect and characterize objects therein (e.g., in terms of their contours), and track their motions through the image sequence in real time, requires substantial computational resources. These resources can vary from system to system and even over time; whereas motion-capture hardware can be standardized into, for example, a sensor package capable of connecting to a wide variety of devices, those devices—computers, tablets, smart phones, etc.—can differ markedly in terms of their ability to run the software that operates the motion-capture hardware and consumes its output. A mismatch between the demands of a motion-capture system and the resources available to support it can result in uneven or unacceptable performance.

A need therefore exists for systems and methods for determining the computational resources available for motion capture and tailoring operation of the system hardware and/or software accordingly.

SUMMARY

The technology disclosed relates to operating a motion-capture system responsive to available computational resources. In particular, it relates to assessing a level of image acquisition and image-analysis resources available using benchmarking of system components. In response, one or more image acquisition parameters and/or image-analysis parameters are adjusted. Acquisition and/or analysis of image data are then made compliant with the adjusted image acquisition parameters and/or image-analysis parameters. In some implementations, image acquisition parameters include frame resolution and frame capture rate and image-analysis parameters include analysis algorithm and analysis density.

In various implementations, the technology disclosed also provides systems and methods for tailoring, and ideally tuning, operation of a motion-capture system to resources available to analyze image data, detect objects, and characterize their movement. In general, images are captured by one or more cameras and stored in "frame buffers"—i.e., partitions or dedicated segments of computer memory that store digital images as ordered arrays of image points or "pixels." A motion-capture system can comprise a set of image-analysis algorithms that locate, in an image, groups or regions of pixels that correspond to an object in the recorded scene—e.g., a user's moving hand. A digital image has a size (in pixels) and a resolution, and the image-analysis algorithm takes image input and processes it into an output defining objects in the image and their movements from image to image. The technology disclosed is directed toward assessing available computational capacity and selecting a suitable (and ideally well suited) combination of parameters specifying, for example, characteristics of the images, their rate of acquisition and how the image-analysis algorithm processes them so that adequate overall performance is provided.

Reference throughout this specification to "one example," "an example," "one implementation," or "an implementation" means that a particular feature, structure, or characteristic described in connection with the example is included in at least one example of the present technology. Thus, the occurrences of the phrases "in one example," "in an example," "one implementation," or "an implementation" in various places throughout this specification are not necessarily all referring to the same example. Furthermore, the particular features, structures, routines, steps, or characteristics can be combined in any suitable manner in one or more examples of the technology. The headings provided herein are for convenience only and are not intended to limit or interpret the scope or meaning of the claimed technology.

Advantageously, these and other aspects enable machines, computers and/or other types of intelligent devices, and/or other types of automata to obtain information about objects, events, actions, and/or users employing gestures, signals, and/or other motions conveying meaning and/or combinations thereof. These and other advantages and features of the implementations herein described, will become more apparent through reference to the following description, the accompanying drawings, and the claims. Furthermore, it is to be understood that the features of the various implementations described herein are not mutually exclusive and can exist in various combinations and permutations.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 4A-4C are top views illustrating an analysis that can be performed on a given slice according to an implementation of the technology disclosed. FIG. 4A is a top view of a slice.

DESCRIPTION

As used herein, a given signal, event or value is "responsive to" a predecessor signal, event or value of the predecessor signal, event or value influenced by the given signal, event or value. If there is an intervening processing element, action or time period, the given signal, event or value can still be "responsive to" the predecessor signal, event or value. If the intervening processing element or action combines more than one signal, event or value, the signal output of the processing element or action is considered "dependent on" each of the signal, event or value inputs. If the given signal, event or value is the same as the predecessor signal, event or value, this is merely a degenerate case in which the given signal, event or value is still considered to be "dependent on" the predecessor signal, event or value. "Dependency" of a given signal, event or value upon another signal, event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify."

Figure 1:
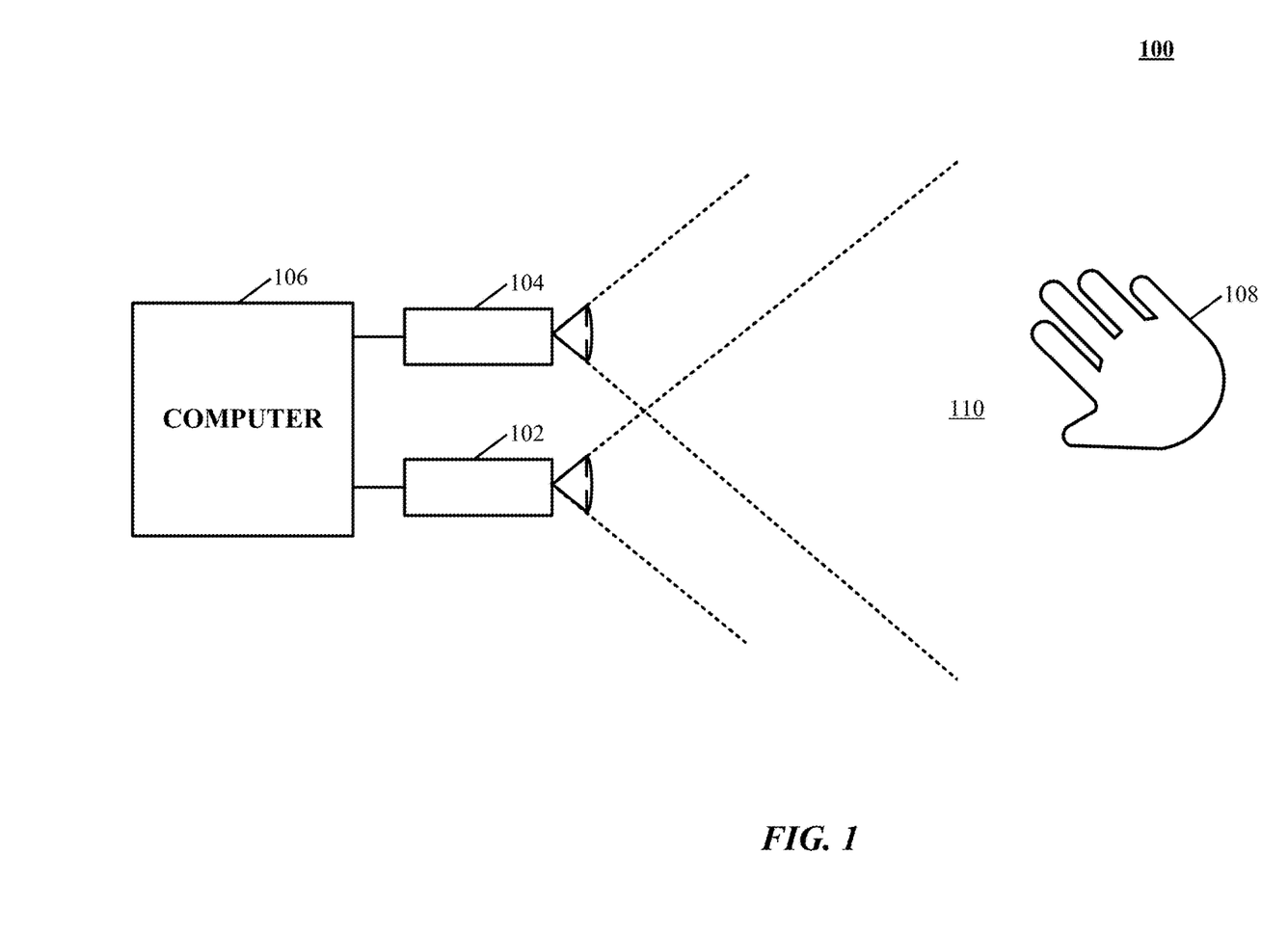
FIG. 1 illustrates an exemplary motion-capture system in accordance with implementations of the technology disclosed.

Motion-capture systems generally include one or more cameras for acquiring images of an object, a computer for processing the images to identify and characterize the object, and a computer display for displaying information related to the identified/characterized object. FIG. 1 illustrates an exemplary motion-capture system 100 that includes two cameras 102, 104 (e.g., digital cameras or similar devices), each having an image sensor (e.g., a CCD or CMOS sensor) and associated imaging optic (e.g., a lens), that are arranged such that their fields of view (indicated by broken lines) overlap in region 110. In other implementations, motion-capture system 100 can include any number of cameras. Cameras 102, 104 provide digital image data to a computer 106, which analyzes the image data to determine the 3D position and motion of the object of interest, e.g., a hand 108, that moves in the field of view of the cameras 102, 104. Importantly, the cameras 102, 104, the computer 106, and a display whose contents are based in some way on the results of the image analysis, can be distributed among two or more physically separate devices, or they can instead be integrated within a single device. While illustrated using an example of a two camera implementation, other implementations are readily achievable using different numbers of cameras or non-camera light sensitive image sensors or combinations thereof.

The cameras 102, 104 can be, e.g., visible-light cameras, infrared (IR) cameras, ultraviolet cameras, or cameras operating in any other electromagnetic frequency regime. Preferably, the cameras 102, 104 are capable of capturing video images (i.e., successive image frames at a constant rate of, say, fifteen frames per second, although no particular frame rate is required). The particular capabilities of cameras 102, 104 can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be a cube of one meter in length. To capture motion of a running person, the volume of interest might have dimensions of tens of meters in order to observe several strides.

The cameras can be oriented in any convenient manner. In the implementation shown, the optical axes 112, 114 of cameras 102, 104, respectively, are parallel, but this is not required. As described below, each camera can be used to define a "vantage point" from which the object is seen; if the location and view direction associated with each vantage point are known, the locus of points in space that project onto a particular position in the camera's image plane can be determined. In some implementations, motion capture is reliable only for objects in area 110 (where the fields of view of cameras 102, 104 overlap), and cameras 102, 104 can be arranged to provide overlapping fields of view throughout the area where motion of interest is expected to occur. In other implementations, the system 100 includes one or more light sources, and the cameras 102, 104 measure the reflection of the light emitted by the light sources on objects 108. The system can include, for example, two cameras 102, 104 and one light source; one camera 102 and two light sources; or any other appropriate combination of light sources and cameras.

Figure 2:
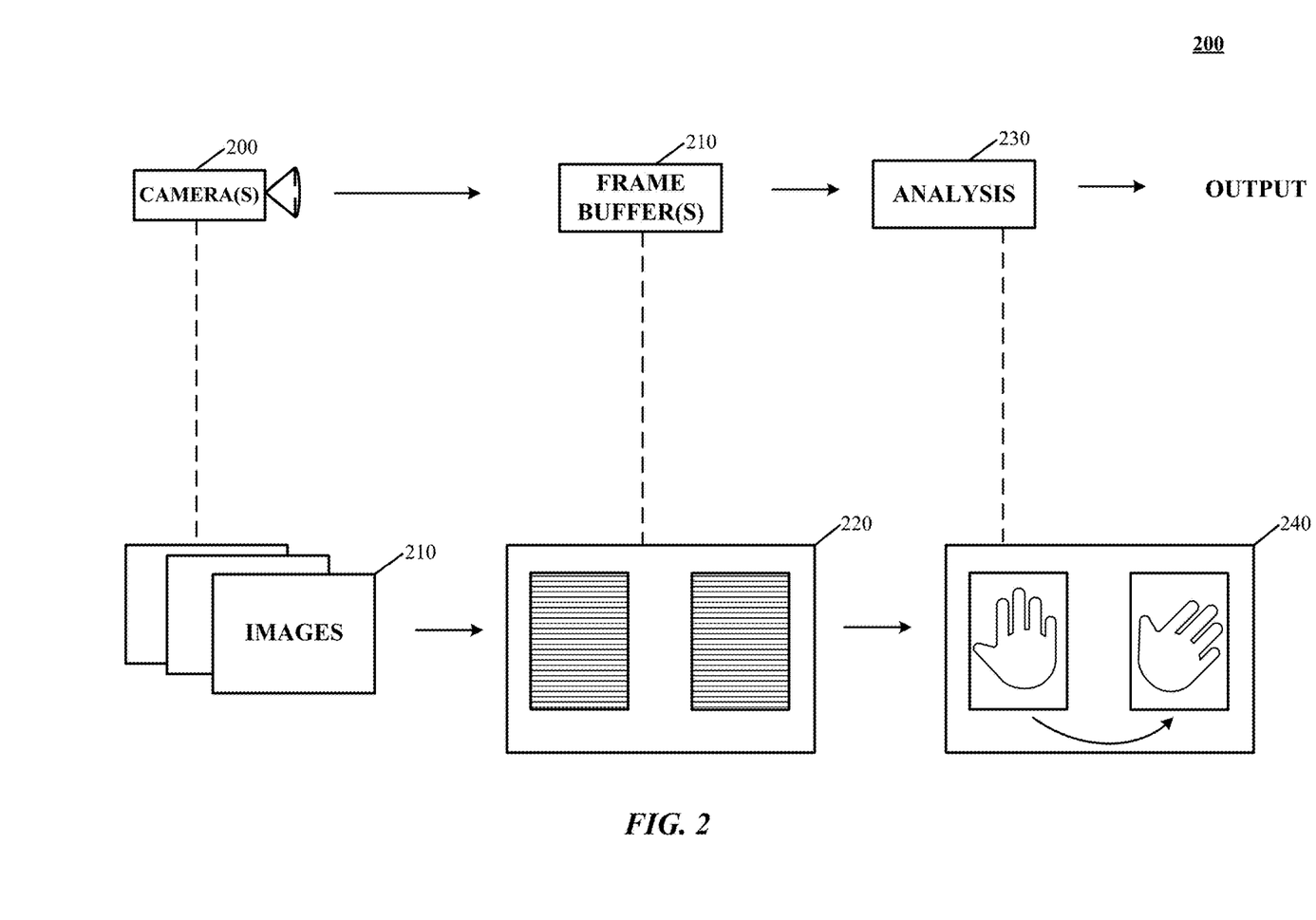
FIG. 2 depicts the basic operations and functional units involved in motion capture and image analysis in accordance with implementations of the technology disclosed.

Computer 106 can generally be any device or combination of devices capable of processing image data using techniques described herein, and a representative implementation is described below. As shown in FIG. 2, the camera(s) 200 record digital images 210 of a scene. Each digital image is captured as an array of pixel values by the associated camera's image sensor, and the digital images are transferred—either in "raw" format or following conventional preprocessing—to one or more frame buffers 215. A frame buffer is a partition or dedicated segment of volatile memory that stores a "bitmaped" image frame 220 corresponding to the pixel values of an image as output by the camera 200 that recorded it. The bitmap is generally organized conceptually as a grid, with each pixel mapped one-to-one or otherwise to output elements of a display. It should be stressed, however, that the topology of how memory cells are physically organized within the frame buffers 215 does not matter and need not conform directly to the conceptual organization.

The number of frame buffers included in a system generally reflects the number of images simultaneously analyzed by the analysis system or module 230, which is described in greater detail below. Briefly, analysis module 230 analyzes the pixel data in each of a sequence of image frames 220 to locate objects therein and track their movement over time (as indicated at 240). This analysis can take various forms, and the algorithm performing the analysis dictates how pixels in the image frames 220 are handled. For example, the algorithm implemented by analysis module 230 can process the pixels of each frame buffer on a line-by-line basis—i.e., each row of the pixel grid is successively analyzed. Other algorithms can analyze pixels in columns, tiled areas, or other organizational formats.

These operations are necessarily computationally intensive; the approach of the technology disclosed is to determine the capacity of the overall system in terms of the responsible components, and to tailor the image analysis to accommodate system limitations while respecting minimum performance requirements. This approach is best understood with reference to representative implementations of a system (which establishes the computational capacity) and an image-analysis algorithm (execution of which can be altered in response to system capacity limitations).

Figure 3:
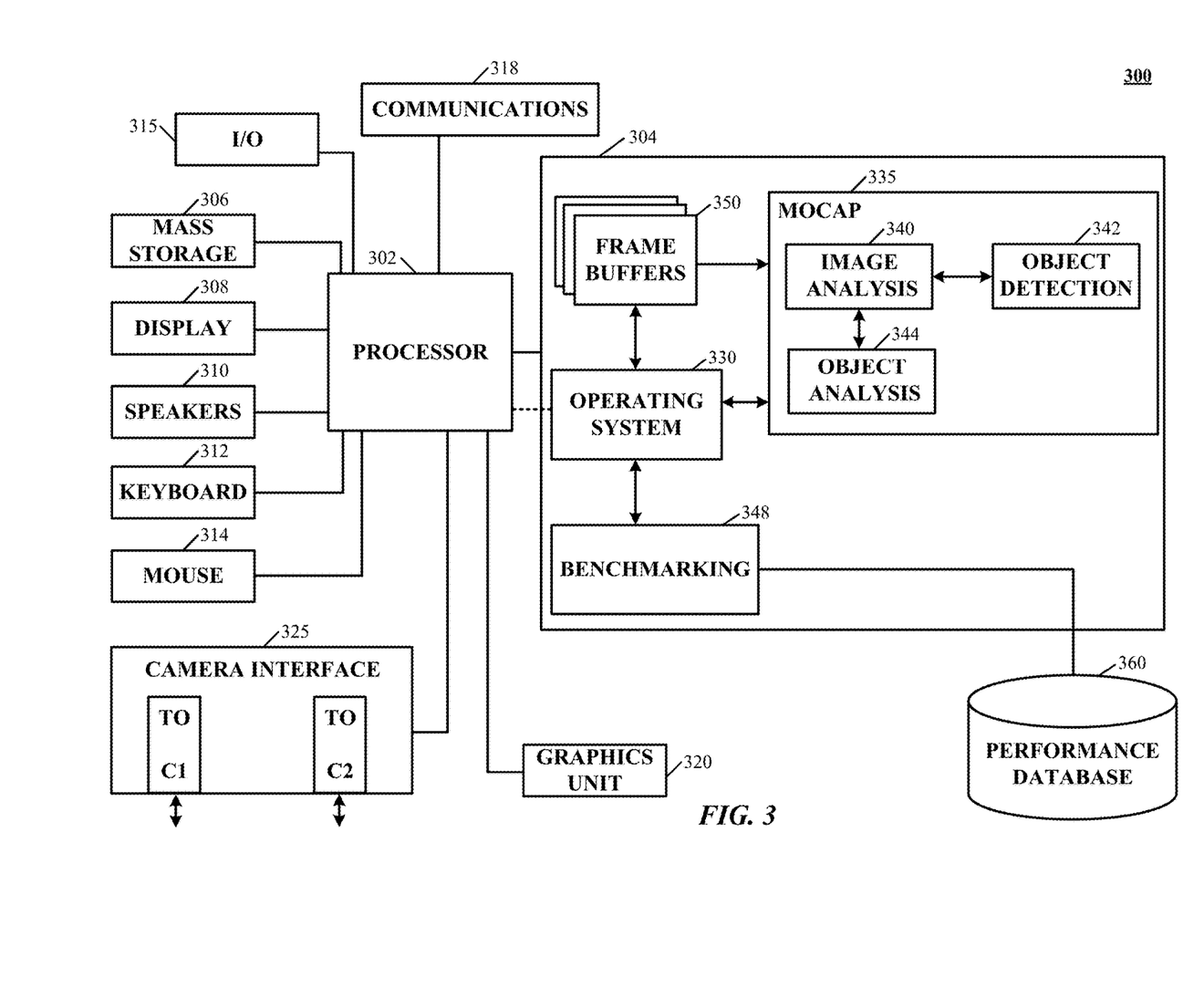
FIG. 3 illustrates an exemplary computer system for image processing, analysis, and display in accordance with implementations of the technology disclosed.

FIG. 3 is a simplified block diagram of a suitably programmed general-purpose computer 300 implementing the computer 106 according to an exemplary implementation of the technology disclosed. The computer 300 includes a processor 302 with one or more central processing units (CPUs or "cores"), volatile and/or non-volatile main memory 304 (e.g., RAM, ROM, or flash memory), one or more mass storage devices 306 (e.g., hard disks, or removable media such as CDs, DVDs, USB flash drives, etc. and associated media drivers), a display device 308 (e.g., a liquid crystal display (LCD) monitor), user input devices such as a keyboard 312 and a mouse 314, and one or more buses (e.g., a single system bus shared between all components, or separate memory and peripheral buses) that facilitate communication between these components. An input-output (I/O) port 315 allows the computer 300 to communicate with external devices via, for example, a universal serial bus (USB), FireWire, or other cable, or wirelessly via Bluetooth, Wi-Fi, etc.

A communications module 318 includes a network interface facilitating wired or wireless communication over a computer and/or telecommunications network. For example, the communications module 318 can include a transceiver for communicating wirelessly with an external computer, e.g., via an IEEE 802.11x protocol. In this way, the processor 302 can perform a portion of the image-processing operations necessary for a full computational reconstruction of an object; wireless transmission of image data allows the computational load to be shared between the processor 302 and an external device. To the extent that the computer 300 performs any significant aspect of image analysis, the computationally intensive operations involved typically necessitate a separate graphics processing unit ("GPU") 320, which supplements the processing capacity of the main processor 302.

The computer 300 can include a camera interface 325, implemented in hardware (e.g., as part of a USB port) and/or software (e.g., executed by the processor 302), that enables communication with the cameras 102, 104. The camera interface 325 can include one or more data ports and associated image buffers for receiving the image frames from the cameras 102, 104; hardware and/or software signal processors to modify the image data (e.g., to reduce noise or reformat data) prior to providing it as input to a motion-capture or other image-processing program; and/or control signal ports for transmitting signals to the cameras 102, 104, e.g., to activate or deactivate the cameras, to control camera settings (frame rate, image quality, sensitivity, etc.), or the like.

The main memory 304 can be used to store instructions to be executed by the processor 302, and these are conceptually illustrated as a group of modules. These modules generally include an operating system 330 (e.g., Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPENACTION or OPENACTION operating system, iOS, Android or other mobile operating systems, or another operating system platform) that directs the execution of low-level, basic system functions (such as memory allocation, file management, and the operation of mass storage devices), as well as higher-level software applications such as, e.g., a motion-capture (mocap) program 335 for analyzing the camera images to track the position of an object of interest. The mocap program 335, in turn, includes an image analysis module 340 that executes routines for detecting objects in an image (as indicated at 342) and analyzing the object to determine its shape, orientation and trajectory (as indicated at 344). A benchmarking module 348 performs tests on various elements of the system 300 as described below. Image frames from the cameras 102, 104 can be stored in frame buffers within the camera interface 325 (as noted above) or the frame buffers can instead by located in a partition 350 of the main memory 304.

In various implementations, the motion captured in a series of camera images is used to compute a corresponding series of output images for display on the display 308. For example, camera images of a moving hand can be translated into a wire-frame or other graphic depiction of the hand by the processor 302. Alternatively, hand gestures can be interpreted as input used to control a separate visual output; by way of illustration, a user can be able to use upward or downward swiping gestures to "scroll" a webpage or other document currently displayed, or open and close her hand to zoom in and out of the page. In any case, the output images are generally stored in the form of pixel data in a frame buffer, e.g., one of the frame buffers 350. A video display controller reads out the frame buffer to generate a data stream and associated control signals to output the images to the display 308. The video display controller can be provided along with the processor 302 and memory 304 on-board the motherboard of the computer 300, and can be integrated with the processor 302 or implemented as a co-processor that manipulates a separate video memory. As noted, the computer 300 can be equipped with a separate graphics or video card that aids with generating the feed of output images for the display 308. The video card generally includes the GPU 320 and video memory, and is useful, in particular, for complex and computationally expensive image processing and rendering. The graphics card can include the frame buffer and the functionality of the video display controller (and the on-board video display controller can be disabled). In general, the image-processing and motion-capture functionality of the system can be distributed between the GPU 320 and the main processor 302 in various ways.

The computer 300 is an illustrative example; variations and modifications are possible. Computers can be implemented in a variety of form factors, including server systems, desktop systems, laptop systems, tablets, smart phones or personal digital assistants, wearable devices, e.g., goggles, head mounted displays (HMDs), wrist computers, and so on. A particular implementation can include other functionality not described herein, e.g., wired and/or wireless network interfaces, media playing and/or recording capability, etc. In some implementations, one or more cameras can be built into the computer rather than being supplied as separate components. Further, the computer processor can be a general-purpose microprocessor, but depending on implementation can alternatively be, e.g., a microcontroller, peripheral integrated circuit element, a customer-specific integrated circuit ("CSIC"), an application-specific integrated circuit ("ASIC"), a logic circuit, a digital signal processor ("DSP"), a programmable logic device such as a field-programmable gate array ("FPGA"), a programmable logic device ("PLD"), a programmable logic array ("PLA"), smart chip, or other device or arrangement of devices. Further, while computer 300 is described herein with reference to particular blocks, this is not intended to limit the technology disclosed to a particular physical arrangement of distinct component parts. For example, in some implementations, the cameras 102, 104 are connected to or integrated with a special-purpose processing unit that, in turn, communicates with a general-purpose computer, e.g., via direct memory access ("DMA").

Suitable algorithms for motion-capture program 335 are described below as well as, in more detail, in U.S. patent application Ser. No. 13/414,485, filed on Mar. 7, 2012 and Ser. No. 13/742,953, filed on Jan. 16, 2013, and U.S. Provisional Patent Application No. 61/724,091, filed on Nov. 8, 2012, which are hereby incorporated herein by reference in their entirety. The various modules can be programmed in any suitable programming language, including, without limitation high-level languages such as C, C++, C#, OpenGL, Ada, Basic, Cobra, FORTRAN, Java, Lisp, Perl, Python, Ruby, or Object Pascal, or low-level assembly languages.

In one implementation, cameras 102, 104 are operated to collect a sequence of images of the object 108. The images are time correlated such that an image from camera 102 can be paired with an image from camera 104 that was captured at the same time (or within a few milliseconds). These images are then analyzed by the image-analysis module 340; in particular, the object-detection routine 342 detects the presence of one or more objects in the image, and the object-analysis routine 344 analyzes detected objects to determine their positions and shape in 3D space. In some implementations, the analysis routine 344 considers a stack of 2D cross-sections through the 3D spatial field of view of the cameras. These cross-sections are referred to herein as "slices." A slice can be any plane at least part of which is in the field of view of cameras 102, 104. For purposes of motion-capture analysis, slices can be selected at regular intervals in the field of view. For example, if the received images include a fixed number of rows of pixels (e.g., 1080 rows), each row can be a slice, or a subset of the rows can be used for faster processing. Where a subset of the rows is used, image data from adjacent rows can be averaged together, e.g., in groups of two or three.

Figure 4A:
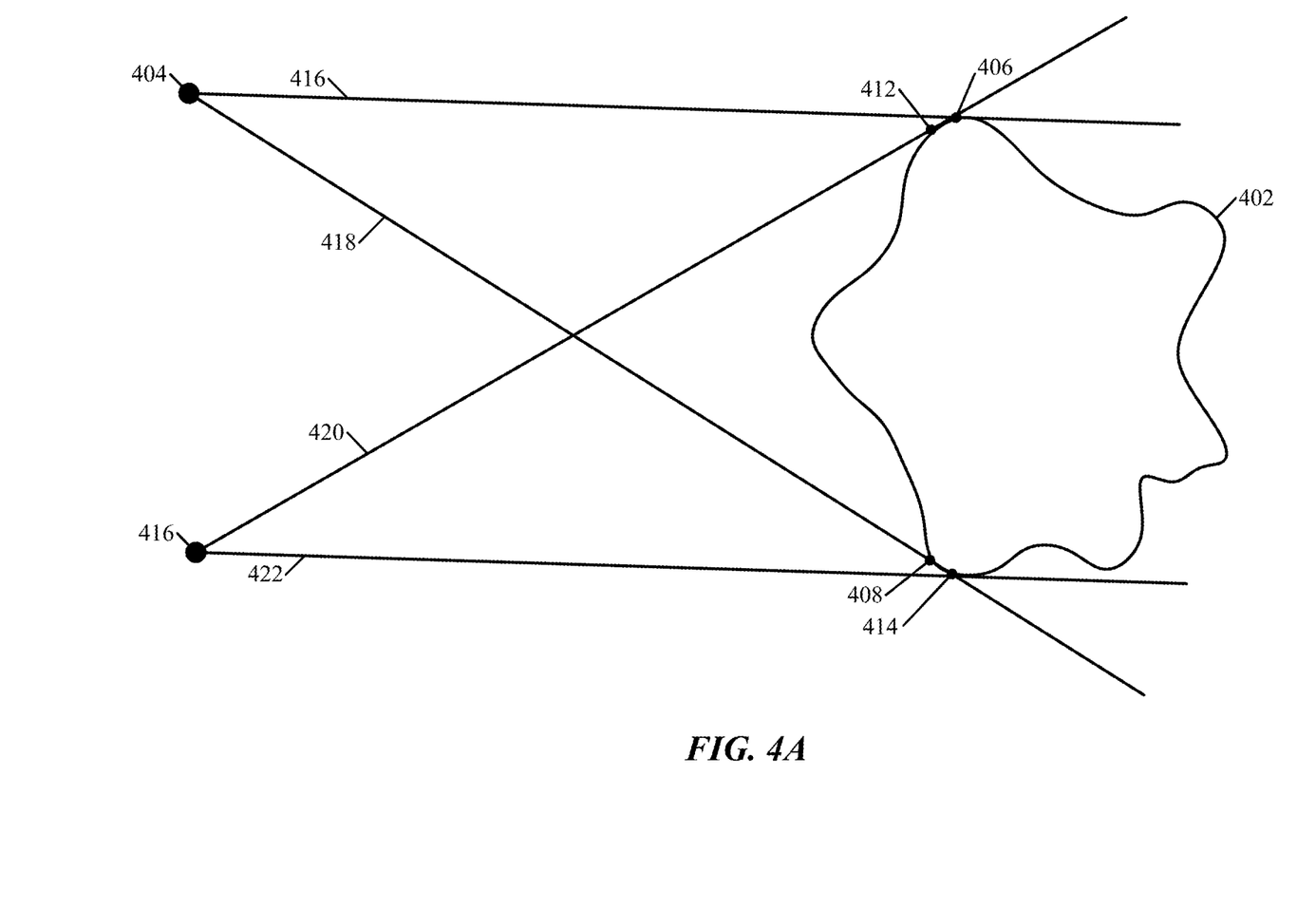
Figure 4B:
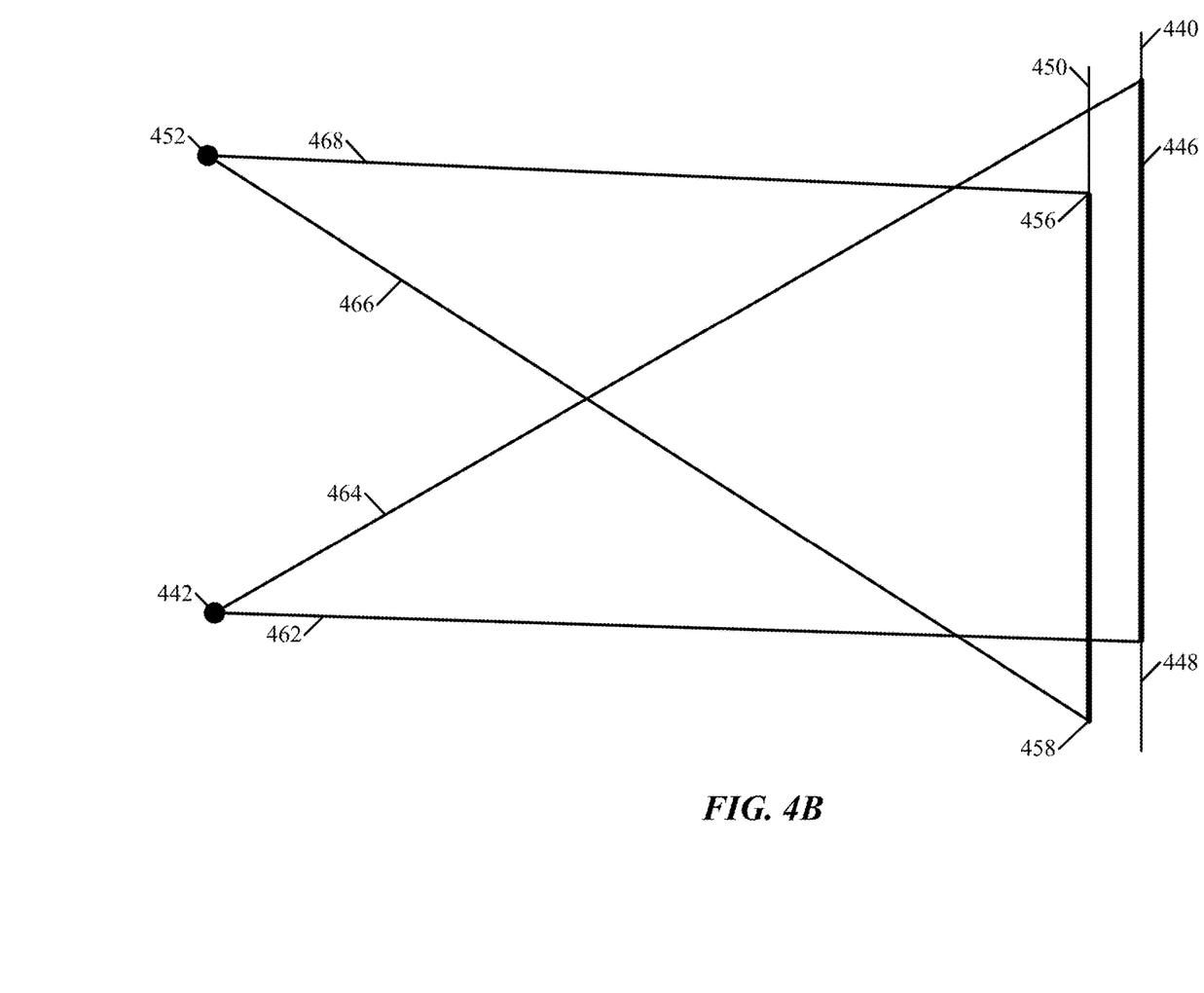
FIG. 4B illustrates projecting edge points from an image plane to a vantage point to define tangent lines.
Figure 4C:
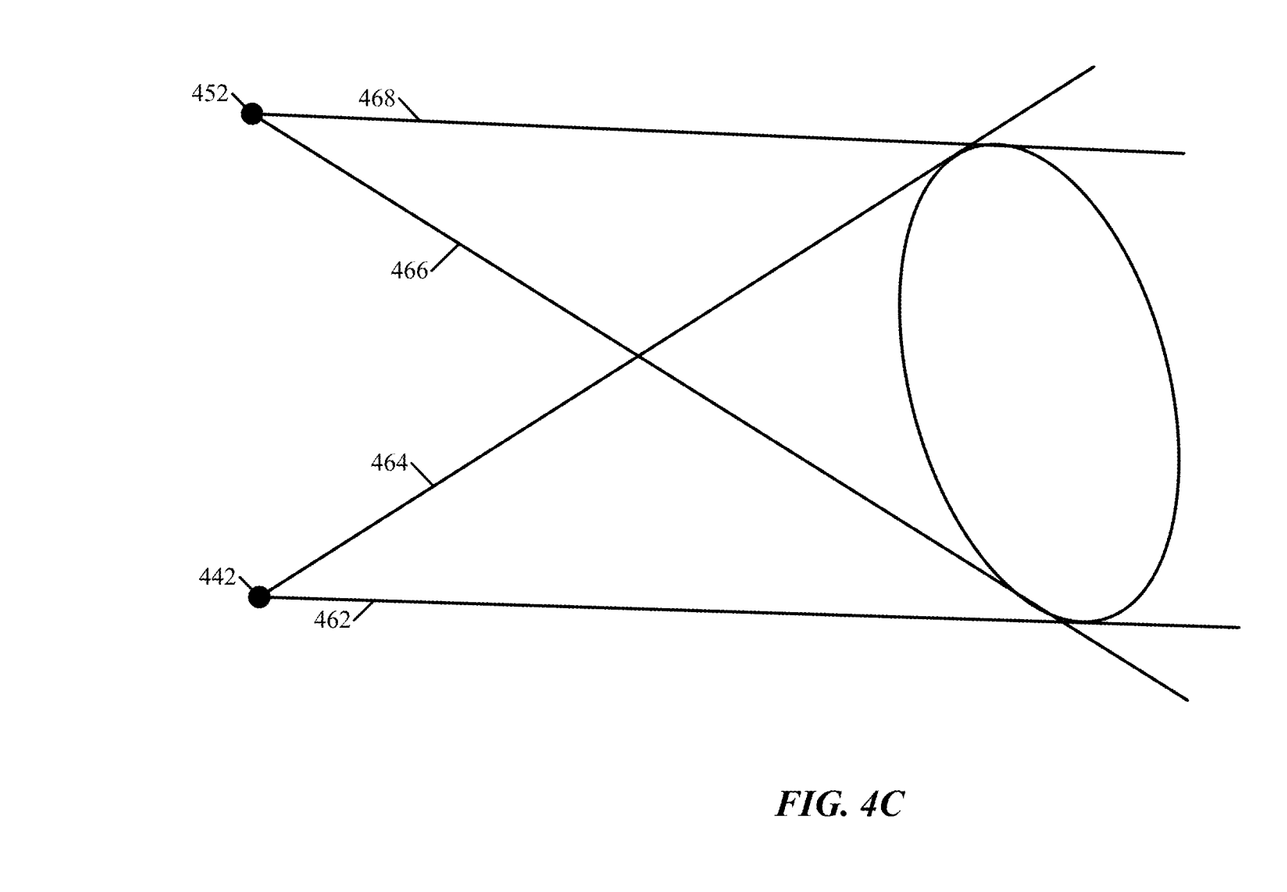
FIG. 4C illustrates fitting an ellipse to tangent lines as defined in FIG. 4B.

FIGS. 4A-4C illustrate an analysis that can be performed by the object-analysis routine 344 on a given slice. FIG. 4A is a top view of a slice as defined above, corresponding to an arbitrary cross-section 402 of an object. Regardless of the particular shape of cross-section 402, the object as seen from a first vantage point 404 has a "left illuminated edge" point 406 and a "right illuminated edge" point 408. As seen from a second vantage point 410, the same object has a "left illuminated edge" point 412 and a "right illuminated edge" point 414. These are in general different points on the boundary of object 402. A tangent line can be defined that connects each illuminated edge point and the associated vantage point. For example, FIG. 4A also shows that tangent line 416 can be defined through vantage point 404 and left illuminated edge point 406; tangent line 418 through vantage point 404 and right illuminated edge point 408; tangent line 420 through vantage point 410 and left illuminated edge point 412; and tangent line 422 through vantage point 410 and right illuminated edge point 414.

It should be noted that all points along any one of tangent lines 416, 418, 420, 422 will project to the same point on an image plane. Therefore, for an image of the object from a given vantage point, a left illuminated edge point and a right illuminated edge point can be identified in the image plane and projected back to the vantage point, as shown in FIG. 4B, which is another top view of a slice, showing the image plane for each vantage point. Image 440 is obtained from vantage point 442 and shows left illuminated edge point 446 and right illuminated edge point 448. Image 450 is obtained from vantage point 452 and shows left illuminated edge point 456 and right illuminated edge point 458. Tangent lines 462, 464, 466, 468 can be defined as shown. Given the tangent lines of FIG. 4B, the location in the slice of an elliptical cross-section can be determined, as illustrated in FIG. 4C, where ellipse 470 has been fit to tangent lines 462, 464, 466, 468 of FIG. 4B.

Figure 5:
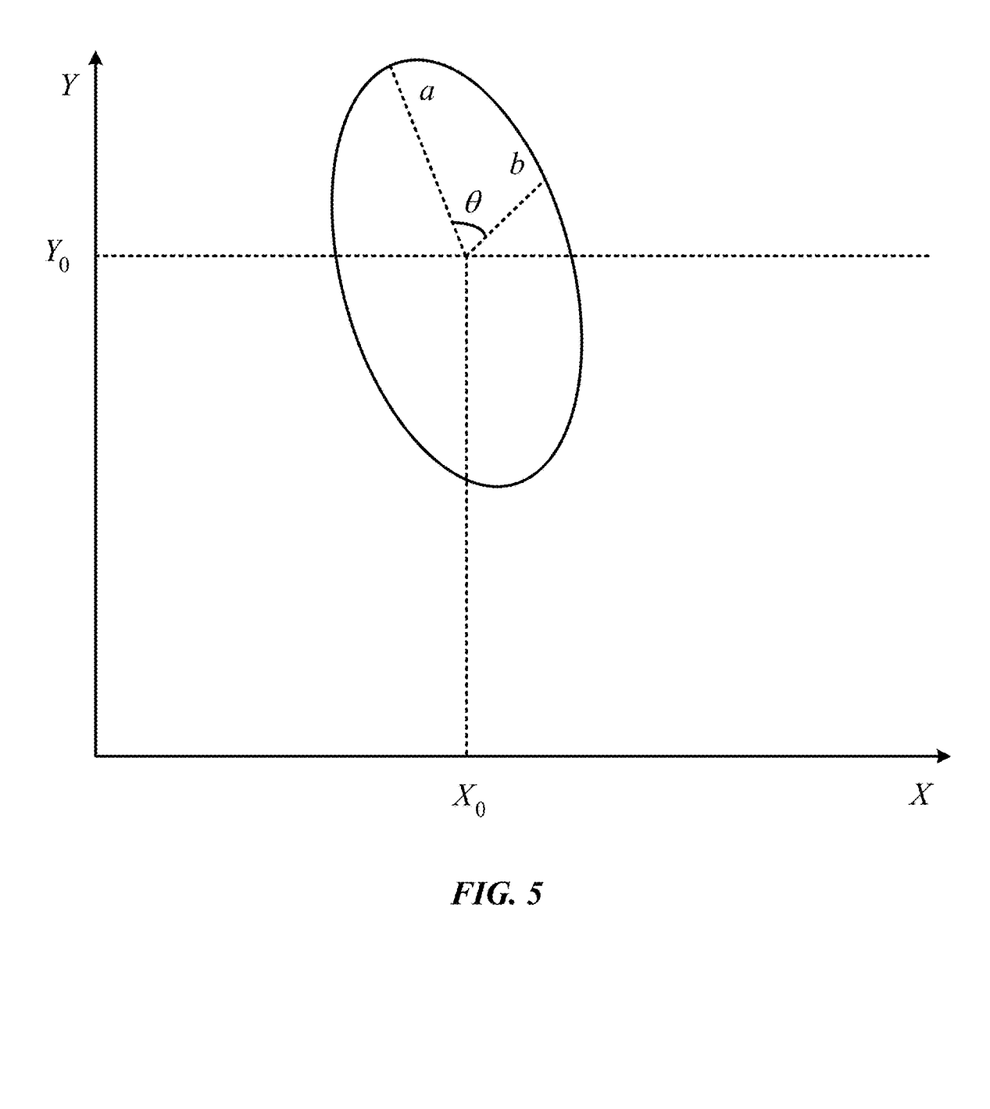
FIG. 5 is a characterization of an ellipse into different parameters across the xy plane.

In general, as shown in FIG. 5, an ellipse in the xy plane can be characterized by five parameters: the x and y coordinates of the center ($x_C$, $y_C$), the semimajor axis (a), the semiminor axis (b), and a rotation angle ($\theta$) (e.g., the angle of the semimajor axis relative to the x axis). With only four tangents, as is the case in FIG. 4C, the ellipse is underdetermined. However, an efficient process for estimating the ellipse in spite of this has been developed. In various implementations as described below, this involves making an initial working assumption (or "guess") as to one of the parameters and revisiting the assumption as additional information is gathered during the analysis. This additional information can include, for example, physical constraints based on properties of the cameras and/or the object.

In some implementations, more than four tangents to an object can be available for some or all of the slices, e.g., because more than two vantage points are available. An elliptical cross-section can still be determined, and the process in some instances is somewhat simplified as there is no need to assume a parameter value. In some instances, the additional tangents can create additional complexity. In some implementations, fewer than four tangents to an object can be available for some or all of the slices, e.g., because an edge of the object is out of range of the field of view of one camera or because an edge was not detected. A slice with three tangents can be analyzed. For example, using two parameters from an ellipse fit to an adjacent slice (e.g., a slice that had at least four tangents), the system of equations for the ellipse and three tangents is sufficiently determined that it can be solved. As another option, a circle can be fit to the three tangents; defining a circle in a plane requires only three parameters (the center coordinates and the radius), so three tangents suffice to fit a circle. Slices with fewer than three tangents can be discarded or combined with adjacent slices.

In some implementations, each of a number of slices is analyzed separately to determine the size and location of an elliptical cross-section of the object in that slice. This provides an initial 3D model (specifically, a stack of elliptical cross-sections), which can be refined by correlating the cross-sections across different slices. For example, it is expected that an object's surface will have continuity, and discontinuous ellipses can accordingly be discounted. Further refinement can be obtained by correlating the 3D model with itself across time, e.g., based on expectations related to continuity in motion and deformation.

In accordance with the technology disclosed, the benchmarking module 348 assesses the level of computational resources available to support the operations of the mocap program 335. As noted, these resources can be on-board components of the computer 300 or can be, in part, external components in wired or wireless communication with the computer 300 via an I/O port 315 or the communications module 318. This determination is used in tuning motion-capture functions as described below. In particular, the benchmarking module 348 can determine at least one system parameter relevant to processing resources—e.g., the speed of the processor 302, the number of cores in the processor 302, the presence and/or speed of the GPU 320, the size of the graphics pipeline, the size of memory 304, memory throughput, the amount of cache memory associated with the processor 302, and the amount of graphics memory in the system. Alternatively or in addition, the benchmarking module 348 can cause the operating system 330 to assess a throughput parameter such as bus speed and a data-transfer parameter such as USB bandwidth or the current network bandwidth or time of flight. Data-transfer parameters dictate, for example, the upper performance limit of external resources, since their effective speed cannot exceed the rate at which data is made usable to the system 300. All of these parameters are collectively referred to as "capacity parameters."

Some capacity parameters are easily obtained by causing the operating system 330 to query the hardware platform of the system 300, which typically contains "pedigree" information regarding system characteristics (processor type, speed, etc.). To obtain other capacity parameters, the benchmarking module 348 can run conventional, small-scale tests on the hardware to determine (i.e., to measure directly) performance characteristics such as memory throughput, graphics pipeline, processor speed. For additional background information regarding benchmarking, reference can be made to e.g., Ehliar & Liu, "Benchmarking network processors," available at http://www.da.isy.liu.se/pubs/ehliar/ehliar-ssocc2004.pdf, which is hereby incorporated by reference).

The benchmarking module 348 can use the obtained capacity parameters in a tuning algorithm or can instead use them to query a performance database 360. The database 360 contains records relating various capacity parameter levels to different image-analysis tuning information, which depend, in turn, on the type of algorithm(s) employed in image analysis. Image-analysis tuning include varying the amount of frame data upon which the image-analysis module 340 operates or the output resolution—e.g., in the case of the motion-capture algorithm discussed above, the density of closed curves generated to approximate the object contour (that is, the number of slices relative to the detected object size in pixels). The records in the database 360 can also specify an accuracy level associated with a particular set of capacity parameters; if an application that utilizes the output of the mocap program 335 can tolerate a lower accuracy level than the system can theoretically provide, fewer resources can be devoted to supporting the image-analysis module 340 in order to free them up for other tasks.

Thus, the results of the benchmarking analysis can determine the coarseness of the data provided to the image-analysis module 340, the coarseness of its analysis, or both in accordance with entries in the performance database 360. For example, while with adequate computational resources the image-analysis module 340 can operate on every image frame and on all data within a frame, capacity limitations can dictate analysis of a reduced amount of image data per frame (i.e., resolution) or discarding of some frames altogether. If the data in each of the frame buffers 350 is organized as a sequence of data lines, for example, the result of benchmarking can dictate using a subset of the data lines. The manner in which data is dropped from the analysis can depend on the image-analysis algorithm or the uses to which the motion-capture output is put. In some implementations, data is dropped in a symmetric or uniform fashion—e.g., every other line, every third line, etc. is discarded up to a tolerance limit of the image-analysis algorithm or an application utilizing its output. In other implementations, the frequency of line dropping can increase toward the edges of the frame. Still other image-acquisition parameters that can be varied include the frame size, the frame resolution, and the number of frames acquired per second. In particular, the frame size can be reduced by, e.g., discarding edge pixels or by resampling to a lower resolution (and utilizing only a portion of the frame buffer capacity). Parameters relevant to acquisition of image data (e.g., size and frame rate and characteristics) are collectively referred to as "acquisition parameters," while parameters relevant to operation of the image-analysis module 340 (e.g., in defining the contour of an object) are collectively referred to as "image-analysis parameters." The foregoing examples of acquisition parameters and image-analysis parameters are representative only, and not limiting.

Acquisition parameters can be applied to the camera interface 325 and/or to the frame buffers 350. The camera interface 325, for example, can be responsive to acquisition parameters in operating the cameras 102, 104 to acquire images at a commanded rate, or can instead limit the number of acquired frames passed (per unit time) to the frame buffers 350. Image-analysis parameters can be applied to the image-analysis module 340 as numerical quantities that affect the operation of the contour-defining algorithm.

The desirable values for acquisition parameters and image-analysis parameters appropriate to a given level of available resources can depend, for example, on the characteristics of the image-analysis module 340, the nature of the application utilizing the mocap output, and design preferences. These can be reflected in the records of database 360 so that, for example, the database has records pertinent to a number of image-processing algorithms and the benchmarking module 348 selects the record most appropriate to the image-processing algorithm actually used. Whereas some image-processing algorithms can be able to trade off a resolution of contour approximation against input frame resolution over a wide range, other algorithms may not exhibit much tolerance at all—requiring, for example, a minimal image resolution below which the algorithm fails altogether. Database records pertinent to an algorithm of the latter type can specify a lower frame rate rather than a lower image resolution to accommodate a limited availability of computational resources.

The benchmarking analysis can be static or dynamic. In some implementations, the benchmarking module assesses available resources upon start-up, implements the appropriate tuning, and is thereafter inactive. In other implementations, the benchmarking module 348 periodically or continuously monitors one or more capacity parameters subject to variation within a use session, e.g., network bandwidth.

Figure 6:
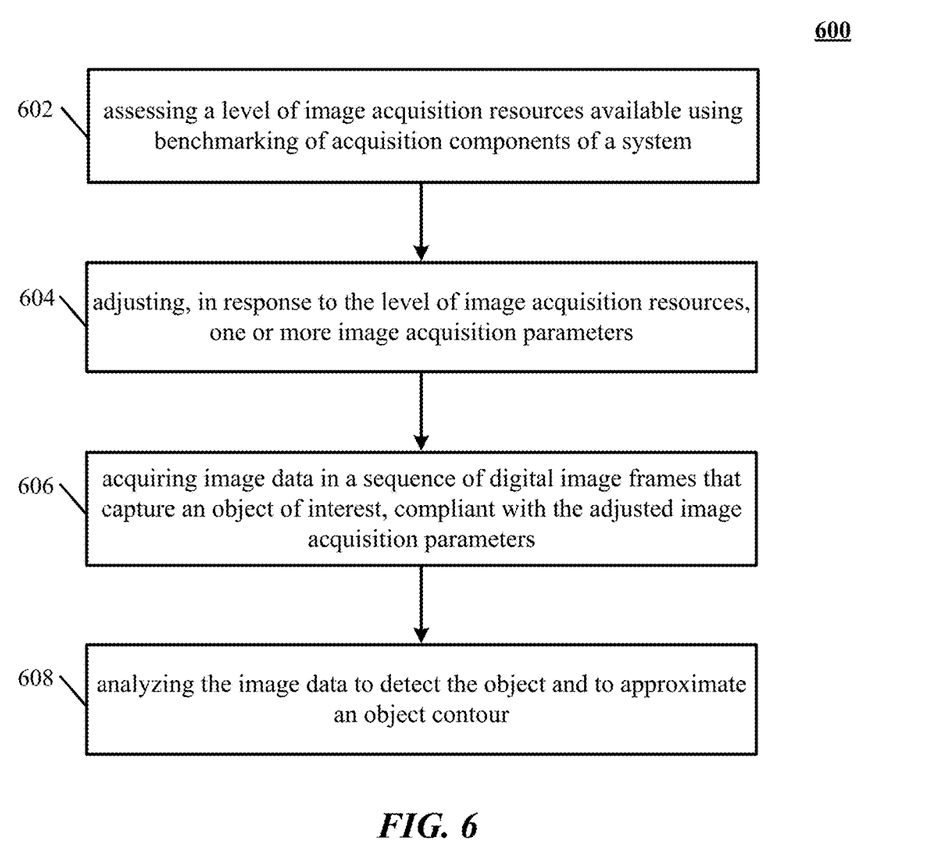
FIG. 6 is a flowchart showing of a method of operating a motion-capture system responsive to available computational resources.

FIG. 6 is a flowchart showing of a method of operating a motion-capture system responsive to available computational resources. Flowchart 600 can be implemented at least partially with and/or by one or more processors configured to receive or retrieve information, process the information, store results, and transmit the results. Other implementations can perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

At action 602, a level of image acquisition resources available is assessed using benchmarking of acquisition components of a system. In one implementation, the benchmarking includes evaluation of at least one capacity parameter of the image acquisition resources. In another implementation, the benchmarking includes evaluation of a USB bus capacity of a channel that couples an acquisition component to a system board. In yet another implementation, the benchmarking includes evaluation of at least processor speed and number of processor cores. In some other implementation, the benchmarking includes evaluation of at least one of a memory throughput or bus speed. In yet another implementation, the benchmarking includes evaluation of at least one of graphics pipeline architecture, graphics memory available, or amount of cache memory. In some implementations, the benchmarking is performed repeatedly during operation of the motion-capture system by periodically monitoring at least one varying capacity parameter.

At action 604, one or more image acquisition parameters are adjusted in response to the level of image acquisition resources. In some implementations, the adjustable image acquisition parameters include frame size, frame resolution, and frame capture rate. In other implementations, a performance database is accessed that identifies adjusted values of image acquisition parameters for evaluated values of capacity parameters.

At action 606, image data in a sequence of digital image frames that capture an object of interest is acquired compliant with the adjusted image acquisition parameters. In some implementations, adjusting the image acquisition parameters includes at least limiting a number of digital image frames passed per unit time to a framer buffer that stores the digital image frames. In other implementations, adjusting the image acquisition parameters includes at least reducing the frame size by preventing acquisition of edge pixels. In yet other implementations, adjusting the image acquisition parameters includes at least reducing the frame size by resampling to a lower resolution and using a portion of a frame buffer.

At action 608, the image data is analyzed to detect the object and to approximate an object contour. In some implementations, the analysis further includes approximating a plurality of closed curves across the detected object that collectively define the approximated object contour. In other implementations, a position and shape of the object is identified based on the analysis.

Some implementations include assessing a level of image-analysis resources available using the benchmarking and adjusting, in response to the level of image-analysis resources, one or more image-analysis parameters that include analysis algorithm and analysis density. Such implementations further include analyzing the image data in compliance with the adjusted image-analysis parameters.

Figure 7:
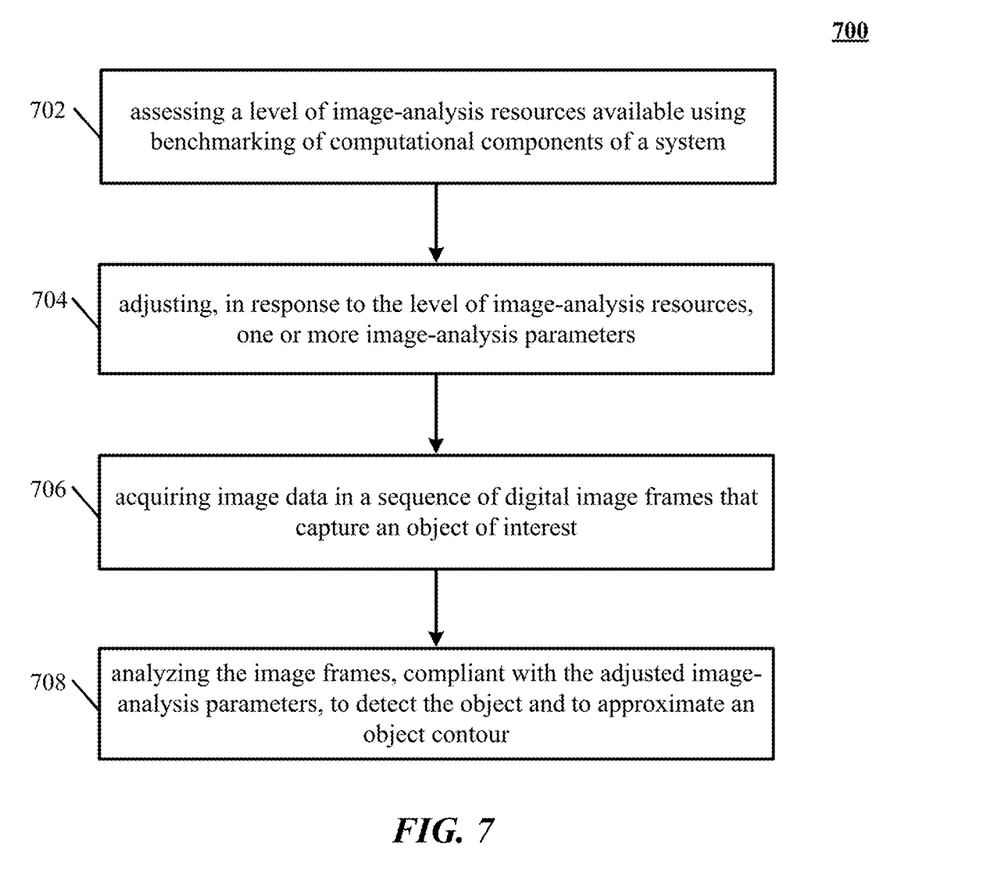
FIG. 7 is another flowchart showing of a method of operating a motion-capture system responsive to available computational resources.

FIG. 7 is another flowchart showing of a method of operating a motion-capture system responsive to available computational resources. Flowchart 700 can be implemented at least partially with and/or by one or more processors configured to receive or retrieve information, process the information, store results, and transmit the results. Other implementations can perform the actions in different orders and/or with different, fewer or additional actions than those illustrated in FIG. 7. Multiple actions can be combined in some implementations. For convenience, this flowchart is described with reference to the system that carries out a method. The system is not necessarily part of the method.

At action 702, a level of image-analysis resources available is assessed benchmarking of computational components of a system. In one implementation, the benchmarking includes evaluation of at least one capacity parameter of the image analysis resources. In another implementation, the benchmarking includes evaluation of a USB bus capacity of a channel that couples an analysis component to a system board. In yet another implementation, the benchmarking includes evaluation of at least processor speed and number of processor cores. In some other implementation, the benchmarking includes evaluation of at least one of a memory throughput or bus speed. In yet another implementation, the benchmarking includes evaluation of at least one of graphics pipeline architecture, graphics memory available, or amount of cache memory. In some implementations, the benchmarking is performed repeatedly during operation of the motion-capture system by periodically monitoring at least one varying capacity parameter.

At action 704, one or more image-analysis parameters are adjusted in response to the level of image-analysis resources. In some implementations, the adjustable image-analysis parameters include analysis algorithm and analysis density. In other implementations, a performance database is accessed that identifies adjusted values of image-analysis parameters for evaluated values of capacity parameters. In yet other implementations, the image-analysis parameter specifies an accuracy level of an approximated object contour. In some other implementations, each of the digital image frames includes a sequence of data lines, the image-analysis parameter specifies a number of data lines analyzed per digital image frame in approximating the object contour.

At action 706, image data in a sequence of digital image frames that capture an object of interest is acquired compliant with the adjusted image acquisition parameters. In some implementations, adjusting the image acquisition parameters includes at least limiting a number of digital image frames passed per unit time to a framer buffer that stores the digital image frames. In other implementations, adjusting the image acquisition parameters includes at least reducing the frame size by preventing acquisition of edge pixels. In yet other implementations, adjusting the image acquisition parameters includes at least reducing the frame size by resampling to a lower resolution and using a portion of a frame buffer.

At action 708, image frames are analyzed compliant with the adjusted image-analysis parameters to detect the object and to approximate an object contour. In some implementations, adjusting the image-analysis parameters further include reducing the frame size by resampling to a lower resolution. In one implementation, adjusting the image-analysis parameters includes at least analyzing a reduced amount of image data per digital image frame. In another implementation, adjusting the image-analysis parameters includes at least analyzing a subset set of the acquired digital image frames. In yet another implementation, adjusting the image-analysis parameters includes at least analyzing a subset of data lines included in the digital image frames. In some implementations, the analysis further includes approximating a plurality of closed curves across the detected object that collectively define the approximated object contour. In other implementations, a position and shape of the object is identified based on the analysis.

The technology disclosed can be used in connection with numerous applications including, without limitation, consumer applications such as interfaces for computer systems, laptops, tablets, telephone devices and/or as interfaces to other devices; gaming and other entertainment applications; medical applications including controlling devices for performing robotic surgery, medical imaging systems and applications such as CT, ultrasound, x-ray, MRI or the like; laboratory test and diagnostics systems and/or nuclear medicine devices and systems; prosthetics applications including interfaces to devices providing assistance to persons under handicap, disability, recovering from surgery, and/or other infirmity; defense applications including interfaces to aircraft operational controls, navigation systems control, on-board entertainment systems control and/or environmental systems control; automotive applications including interfaces to and/or control of automobile operational systems, navigation systems, on-board entertainment systems and/or environmental systems; manufacturing and/or process applications including interfaces to assembly robots, automated test apparatus, work conveyance devices such as conveyors, and/or other factory floor systems and devices; genetic sequencing machines, semiconductor fabrication related machinery, chemical process machinery and/or the like; security applications (e.g., monitoring secure areas for suspicious activity or unauthorized personnel); and/or combinations thereof.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of operating a motion-capture system responsive to available system resources, the method including:
    assessing a level of resources available for performing at least one of acquiring and analyzing an image by benchmarking components of the motion-capture system, the benchmarking of the components including evaluating processing capabilities of the components;
    adjusting, in response to the level of the resources assessed, one or more parameters, wherein the one or more parameters include a frame size and a frame capture rate;
    capturing, by a camera of the motion-capture system, a sequence of digital image frames to acquire image data for an object of interest, and
    analyzing the image data to detect the object of interest;
    wherein at least one of the capturing or analyzing is performed in compliance with the one or more parameters as adjusted.

2. The method of claim 1, wherein:
    analyzing the image data to detect the object of interest is performed compliant with at least one adjusted parameter of the one or more adjusted parameters, wherein the at least one adjusted parameter is an analysis algorithm or an analysis density.

3. The method of claim 1, wherein components of the motion-capture system include on-board components of a computer or external components in wired or wireless communication with the computer.

4. The method of claim 1, wherein the benchmarking of the components includes evaluating a USB bus capacity of a channel that couples a component to a system board of the motion-capture system.

5. The method of claim 1, wherein the processing capabilities of the components include at least a processor speed and a number of processor cores.

6. The method of claim 1, wherein the processing capabilities of the components include at least one of a memory throughput and a bus speed.

7. The method of claim 1, wherein the processing capabilities of the components include at least one of a graphics pipeline architecture, graphics memory availability, and an amount of cache memory.

8. The method of claim 1, further including identifying, via a performance database, adjusted values of parameters for evaluated values of capacity parameters.

9. The method of claim 1, wherein the benchmarking is performed repeatedly during a motion capture operation of the motion-capture system, so as to periodically assess the level of the resources available and adjust the one or more parameters.

10. The method of claim 1, wherein the adjusting of the parameters further includes reducing the frame size by resampling to a lower resolution.

11. The method of claim 1, wherein the analyzing of the image data further includes determining a characteristic of the object of interest.

12. The method claim 11, wherein determining a characteristic of the object of interest includes identifying a position or a shape of the object of interest based on the analyzing of the image data.

13. The method of claim 11, wherein determining a characteristic of the object of interest includes identifying an orientation or trajectory.

14. The method of claim 1, wherein the adjusting of the one or more parameters includes at least analyzing a reduced amount of image data per digital image frame.

15. A non-transitory computer-readable storage medium storing instructions for operating a motion-capture system responsive to available system resources, the instructions which when executed by one or more processors, cause the one or more processors to:
    assess a level of resources available for performing at least one of acquiring and analyzing an image by benchmarking components of the motion-capture system, the benchmarking of the components including evaluating processing capabilities of the components;
    adjust, in response to the level of the resources assessed, one or more parameters, wherein the one or more parameters include a frame size and a frame capture rate;
    acquire, from a sequence of digital image frames captured by a camera of the motion-capture system, image data for an object of interest, and
    analyze the image data to detect the object of interest;
    wherein at least one of the capturing or analyzing is performed in compliance with the one or more parameters as adjusted.

16. A system for operating a motion-capture system responsive to available resources, the system including:

one or more cameras configured to capture a sequence of digital image frames to acquire image data for an object of interest; and hardware configured to perform:

assessing a level of resources available for performing at least one of acquiring and analyzing an image by evaluating processing capabilities of components in the motion-capture system;

adjusting, in response to the level of the resources assessed, one or more parameters, wherein the one or more parameters include a frame size and a frame capture rate;

acquiring, from the sequence of digital image frames captured by a camera of the one or more cameras, image data for an object of interest, and analyzing the image data to detect the object of interest;

wherein at least one of the capturing or analyzing is performed in compliance with the one or more parameters as adjusted.

17. A motion capture device comprising hardware configured to perform:

assessing a level of resources available for performing at least one of acquiring and analyzing an image by evaluating processing capabilities of components in a motion-capture system;

adjusting, in response to the level of the resources assessed, one or more parameters, wherein the one or more parameters include a frame size and a frame capture rate;

acquiring, from a sequence of digital image frames captured by a camera of the motion-capture system, image data for an object of interest, and analyzing the image data to detect the object of interest;

wherein at least one of the capturing or analyzing is performed in compliance with the one or more parameters as adjusted.

18. The method of claim 1, further including: transmitting signals to one or more cameras, thereby activating or deactivating the one or more cameras.

19. The method of claim 1, further including: transmitting signals to one or more cameras, thereby controlling camera settings including at least one of: a frame rate, an image quality, and a sensitivity.

20. The method of claim 1, further including: translating camera images of a moving hand into a wire-frame or graphic depiction of the hand; and interpreting hand gestures as input used to control a separate visual output.

* * * * *